United States Patent
Ikeda et al.

(10) Patent No.: US 10,859,516 B2
(45) Date of Patent: Dec. 8, 2020

(54) X-RAY INSPECTION APPARATUS

(71) Applicant: System Square Inc., Niigata (JP)

(72) Inventors: Noriaki Ikeda, Nagaoka (JP); Sachihiro Nakagawa, Nagaoka (JP)

(73) Assignee: SYSTEM SQUARE INC., Niigata (JP)

( * ) Notice: Subject to any disclaimer, the term of this patent is extended or adjusted under 35 U.S.C. 154(b) by 0 days.

(21) Appl. No.: 16/334,350

(22) PCT Filed: Sep. 20, 2017

(86) PCT No.: PCT/JP2017/033982
§ 371 (c)(1),
(2) Date: Mar. 18, 2019

(87) PCT Pub. No.: WO2018/066364
PCT Pub. Date: Apr. 12, 2018

(65) Prior Publication Data
US 2019/0212464 A1   Jul. 11, 2019

(30) Foreign Application Priority Data

Oct. 4, 2016 (JP) .................................. 2016-196714

(51) Int. Cl.
*G01N 23/04* (2018.01)
*G01N 23/087* (2018.01)
(Continued)

(52) U.S. Cl.
CPC ............ *G01N 23/18* (2013.01); *G01N 23/04* (2013.01); *G01N 23/087* (2013.01); *G01T 1/247* (2013.01);
(Continued)

(58) Field of Classification Search
None
See application file for complete search history.

(56) References Cited

U.S. PATENT DOCUMENTS

| 2014/0270073 A1* | 9/2014 | Spahn .................. A61B 6/482 378/62 |
| 2015/0287193 A1 | 10/2015 | Kato et al. |
| 2019/0212464 A1* | 7/2019 | Ikeda .................. G01V 5/0016 |

FOREIGN PATENT DOCUMENTS

| JP | H810250 A | 1/1996 |
| JP | 200338473 A | 2/2003 |

(Continued)

OTHER PUBLICATIONS

International Search Report in PCT Application No. PCT/JP2017/033982, dated Dec. 19, 2017, 6pp.
(Continued)

*Primary Examiner* — Thomas R Artman
(74) *Attorney, Agent, or Firm* — Hauptman Ham, LLP

(57) ABSTRACT

An X-ray inspection apparatus includes: an X-ray emission unit for emitting an X-ray to an object; an X-ray detection unit for detecting each X-ray photon transmitted through the object by discriminating energy possessed by the photon into one or more energy region(s) in accordance with a predetermined threshold level; a storage unit for storing the object and the associated threshold level; a threshold level setting unit for referring to the storage unit to keep a threshold level for the object specified by inputted information so that the X-ray detection unit can refer to the threshold level as the predetermined threshold level; and an inspection unit for inspecting the object based on a number of photons or an amount corresponding to the number of the photons detected by the X-ray detection unit for each of the one or more energy region(s).

5 Claims, 4 Drawing Sheets

(51) Int. Cl.
  *G01T 1/24* (2006.01)
  *G01N 23/18* (2018.01)
(52) U.S. Cl.
  CPC .............. *G01N 2223/1016* (2013.01); *G01N 2223/304* (2013.01); *G01N 2223/423* (2013.01); *G01N 2223/5015* (2013.01); *G01N 2223/643* (2013.01); *G01N 2223/646* (2013.01)

(56) References Cited

FOREIGN PATENT DOCUMENTS

| | | |
|---|---|---|
| JP | 2004-8460 A | 1/2004 |
| JP | 2007-232586 A | 9/2007 |
| JP | 2009-14624 A | 1/2009 |
| JP | 2010-91483 A | 4/2010 |
| WO | 2014/098196 A1 | 6/2014 |

OTHER PUBLICATIONS

International Preliminary Report on Patentability in PCT Application No. PCT/JP2017/033982, dated Dec. 19, 2017, 17pp.
Office Action in JP Patent No. 6569070, dated Mar. 23, 2020, 21pp.

* cited by examiner

| MEASURING OBJECT (BY TYPE) | THRESHOLD LEVEL 1 (Low) | THRESHOLD LEVEL 2 (High) |
|---|---|---|
| A | ◇△◯ | ◇◯△ |
| B | △◯◇ | |
| C | ◯△◇ | ◯◇△ |
| ⁝ | ⁝ | ⁝ |
| ⁝ | ⁝ | ⁝ |

| MEASURING OBJECT (BY TYPE) | THRESHOLD LEVEL NUMBER |
|---|---|
| A | 1 |
| B | 5 |
| C | 2 |
| . | . |
| . | . |

FIG. 4B

| THRESHOLD LEVEL NUMBER | THRESHOLD LEVEL 1(Low) | THRESHOLD LEVEL 2(High) |
|---|---|---|
| 1 | ◇△○ | ◇○△ |
| 2 | △○◇ | |
| 3 | ○△◇ | ○◇△ |
| 4 | ○△◇ | |
| 5 | △○△ | ◇○△ |

X-RAY INSPECTION APPARATUS

RELATED APPLICATIONS

The present application is a National Phase of International Application No. PCT/JP2017/033982, filed Sep. 20, 2017 and claims priority of Japanese Patent Application No. 2016-196714, filed Oct. 4, 2016.

TECHNICAL FIELD

The present invention relates to an X-ray inspection apparatus for inspecting foreign matter by emitting X-rays to a target product or the like.

BACKGROUND ART

Generally, in each step from manufacturing, packing to shipping of a product, an inspection, such as whether foreign matter is mixed in the product or the package, is performed by an inspection method suitable for a measuring object, which is an inspection target or for the type (material, size, or the like) of the foreign matter that may be contained in the measuring object. Among them, in an X-ray inspection apparatus capable of nondestructively inspecting the product or the like, X-rays are emitted to a target product or the like, and the transmitted X-rays are detected so that the presence or absence of the foreign matter inside the product, which is invisible from the outside, can be inspected.

As a method of detecting image information as an electric signal in the X-ray inspection apparatus, there are an indirect conversion method, in which an X-ray is first converted into visible light by a scintillator and then converted into an electric signal by a photodiode, and a direct conversion method, in which an X-ray is directly converted into an electric signal by a semiconductor element such as CdTe. In the indirect conversion method, in principle, a loss occurs in the luminous efficiency of the scintillator and the charge conversion efficiency of the photodiode. On the other hand, in the direct conversion method, the conversion efficiency is high because the X-ray is directly converted into an electric charge.

Patent Document 1 discloses an X-ray inspection apparatus utilizing a line sensor of the direct conversion method and realizes photon counting by energy. In this apparatus, the intensity of the X-ray, emitted toward a measuring object, after transmitted through the measuring object and a belt conveyor conveying thereof is converted into a low-energy X-ray transmission image and a high-energy X-ray transmission image separately by using a direct conversion type X-ray line sensor which can discriminate photon energy. After that the presence or absence of foreign matter inside the measuring object is visualized based on contrast between the measuring object and the foreign matter in an image obtained by calculating difference between both images.

PRIOR ART REFERENCES

Patent Document

Patent Document 1: JP 2010-091483 A

SUMMARY OF THE INVENTION

Problems to be Solved by the Invention

The transmission image obtained with the low-energy X-ray and the transmission image obtained with the high-energy X-ray vary depending on which level an energy threshold for discriminating the low-energy photon and the high-energy photon is set. Since the product, which is the measuring object, and the foreign matter contained therein have different X-ray transmittances due to the physical properties thereof, in a case where a certain threshold level is set, even if an image, in which the foreign matter is clearly visualized from the pair of the low-energy and high-energy X-ray images, is obtained for a certain measuring object, a clear image with high contrast is not always obtained for a measuring object with different physical properties. However, the threshold level could not have been changed for each measuring object in the conventional X-ray inspection apparatus.

An object of the present invention is to provide an X-ray inspection apparatus capable of accurately inspecting a measuring object regardless of the physical properties of the measuring object and the like.

Means for Solving the Problems

An X-ray inspection apparatus according to the present invention includes: an X-ray emission means for emitting an X-ray to a measuring object; an X-ray detection means for detecting each X-ray photon transmitted through a measuring object by discriminating energy possessed by the photon into one or more energy region(s) in accordance with a predetermined threshold; a storage means for storing the measuring object and the threshold level which are directly or indirectly associated; a threshold level setting means for referring to the storage means to keep a threshold level for the measuring object specified by inputted information so that the X-ray detection means can refer to the threshold level as the predetermined threshold level; and an inspection means for inspecting the measuring object based on a number of photons or an amount corresponding to the number of photons detected by the X-ray detection means for each of the one or more energy region(s). The amount corresponding to the number of photons is, for example, a charge amount. Based on the number of photons or the amount corresponding to the number of photons detected by the X-ray detection means for each of the one or more energy region(s), the inspection means may output, as the inspection result of the measuring object, an X-ray transmission image generated for each of the one or more energy region(s). Moreover, the storage means may further store information, which indicates an inspection method of the measuring object in the inspection means, in association with the measuring object, and the inspection means may refer to the storage means and inspect the measuring object by an inspection method for the measuring object specified by information inputted into the threshold level setting means.

Advantageous Effects of Invention

According to the X-ray inspection apparatus of the present invention, since an optimum threshold level can be set according to the physical properties of the measuring object and the like, it is possible to accurately inspect the measuring object regardless of the physical properties of the measuring object and the like.

BRIEF DESCRIPTION OF THE DRAWINGS

FIG. 3 is a diagram showing one example of a table showing thresholds for respective measuring objects W.

FIG. 4A and FIG. 4B are diagrams showing another example of a table showing thresholds for respective measuring objects W.

DESCRIPTION OF EMBODIMENTS

Hereinafter, embodiments of the present invention will be described based on the drawings.

Figure 1:
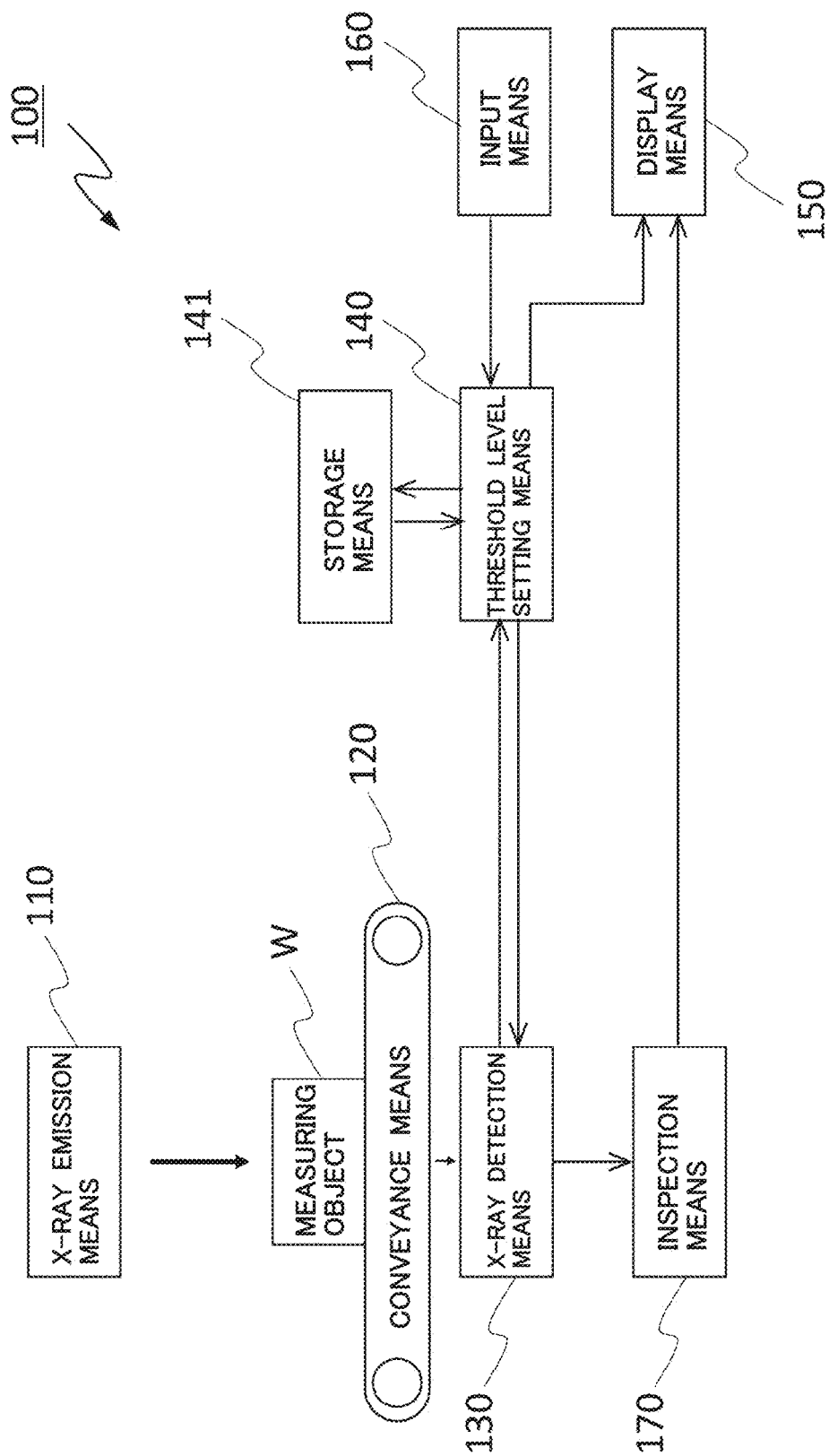
FIG. 1 is a functional block diagram of an X-ray inspection apparatus 100 of the present invention.

FIG. 1 shows a functional block diagram of an X-ray inspection apparatus 100 of the present invention. The X-ray inspection apparatus 100 includes an X-ray emission means 110, a conveyance means 120, an X-ray detection means 130, a threshold setting means 140, a storage means 141, a display means 150, an input means 160 and an inspection means 170.

The X-ray emission means 110 emits X-rays toward a measuring object W placed on the conveyance means 120. The conveyance means 120 is, for example, a belt conveyor with high X-ray transmittance, is arranged between the X-ray emission means 110 and the X-ray detection means 130, which are arranged to oppose each other, and conveys the measuring object W placed thereon. The X-rays emitted from the X-ray emission means 110 toward the measuring object W reaches the X-ray detection means 130 after being absorbed by the measuring object W and the conveyance means 120 and transmitted therethrough.

The X-ray detection means 130 adopts, for example, a so-called X-ray line sensor, in which a plurality of X-ray detection elements are aligned in a direction orthogonal to the conveyance direction of the conveyance means 120. In the X-ray inspection apparatus 100, X-ray photons transmitted from the measuring object W are successively scanned by the X-ray line sensor while the measuring object W is moved by the conveyance means 120.

This embodiment adopts an X-ray line sensor of a direct conversion method capable of detecting photons by discriminating the energy of the photon into one or more energy region(s) in accordance with a predetermined threshold level for each reached X-ray photon. Examples of the X-ray detection elements capable of directly converting an X-ray into an electric signal include semiconductor elements such as CdTe. In the X-ray detection means 130, in each X-ray detection element constituting the X-ray line sensor, an electron-hole pair is generated by the reached X-ray photons, the energy of a detection signal obtained by amplifying the charge thereof is compared with the predetermined threshold level, and the number of times the threshold level has been exceeded or has not been exceeded within a predetermined time is outputted as a photon counting number (the number of detected photons) of the X-ray detection element in the energy region defined by the threshold level. Note that, instead of the number of times the energy of the detection signal has exceeded the predetermined threshold level, an integral charge amount, which is obtained by integrating the charge amount of the detection signal whose energy has exceeded or has not exceeded the predetermined threshold level with the predetermined time, may be outputted as an integral charge amount of the X-ray detection element in the energy region defined by the threshold level. Hereinafter, a case where the output is the photon counting number will be described as an example.

Figure 2A:
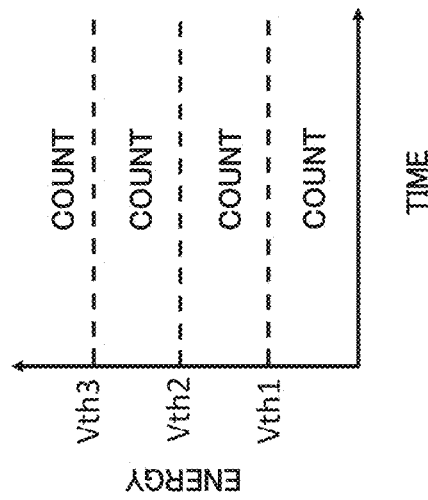
FIG. 2A to FIG. 2F are diagrams exemplifying a threshold setting method.

The X-ray detection means 130 is configured to be able to set a predetermined threshold level for the number corresponding to the number of energy regions to discriminate the photon by energy thereof in photon counting. In a case of two energy regions, for example, the X-ray detection means 130 is configured so that, as shown in FIG. 2A, two threshold levels (a threshold level Vth1 on the low energy side and a threshold level Vth2 on the high-energy side,) can be set, and the photon counting number exceeding each threshold level is successively taken into the memory. Then, a high-energy X-ray transmission image can be generated based on the photon counting number exceeding the threshold level Vth2 on the high-energy side in each X-ray detection element, and a low-energy X-ray transmission image can be generated based on the number obtained by subtracting the photon counting number exceeding the threshold level Vth2 on the high-energy side from the photon counting number exceeding the threshold level Vth1 on the low-energy side in each detection element. Note that the energy regions for photon counting may be set to be partially overlapped to generate two or more X-ray transmission images, in which, for example, a high-energy X-ray transmission image is generated in the same way as above, and, instead of a low energy X-ray transmission image, a low-energy+high-energy X-ray transmission image is generated based on the photon counting number exceeding the threshold level Vth1 on the low-energy side.

Figure 2C:
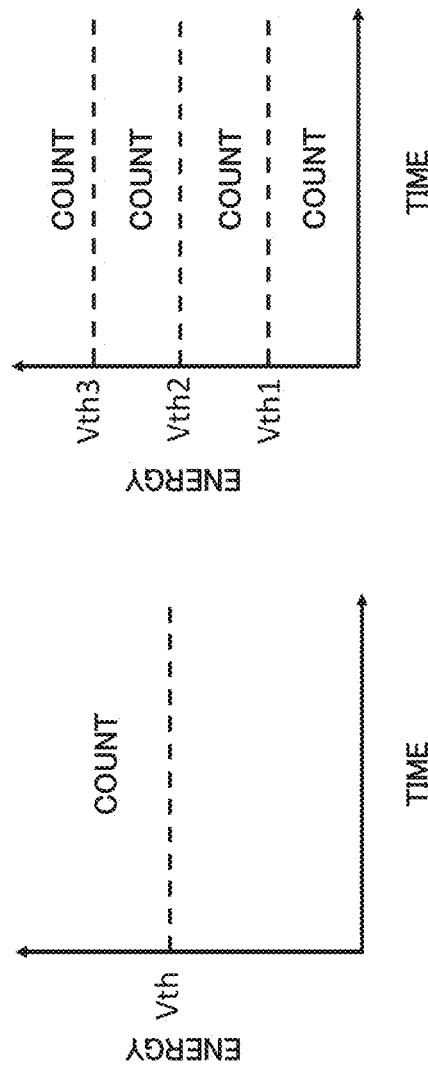
Figure 2E:
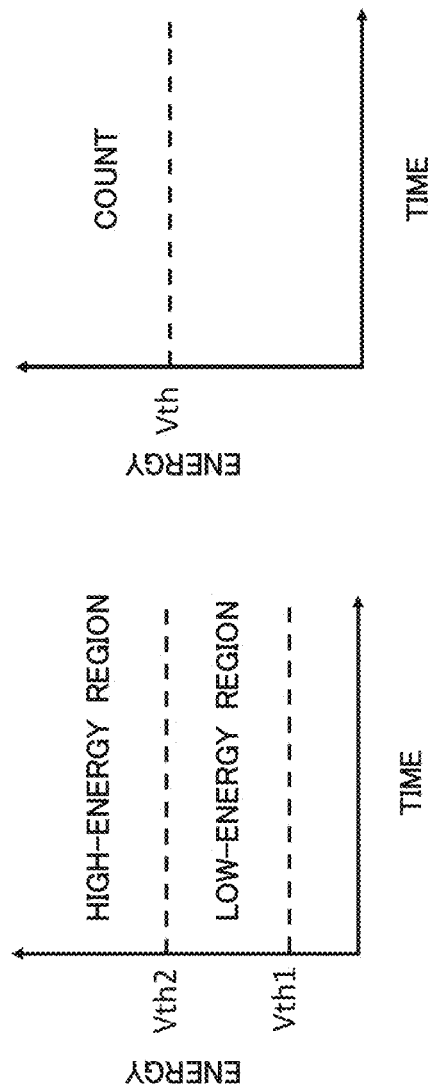
Figure 2B:
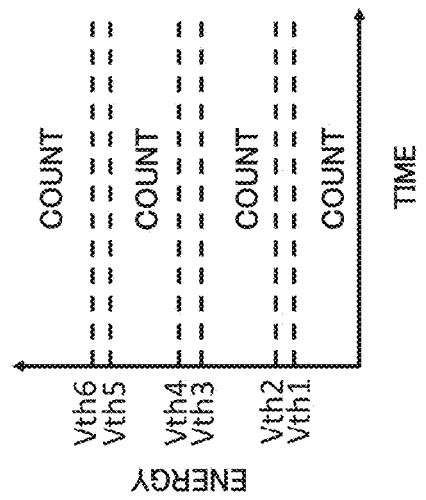
Figure 2D:
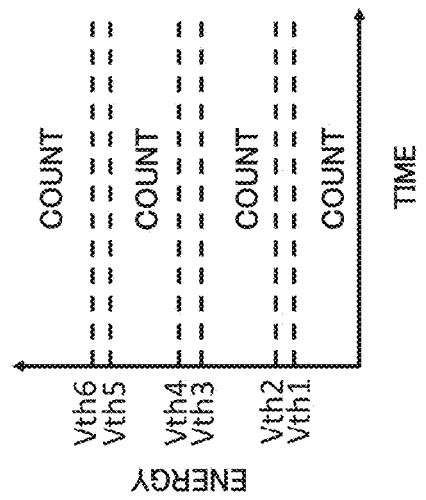
Figure 2F:
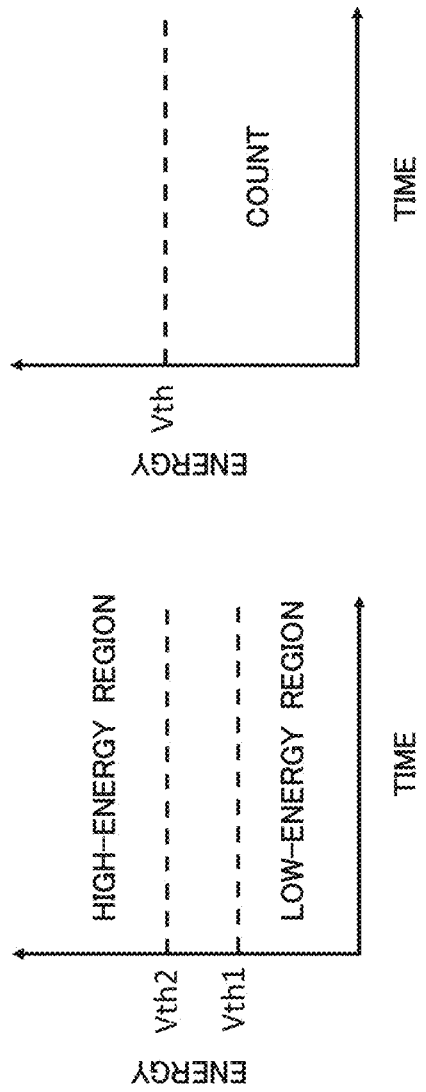

In a case of two energy regions for photon counting, the threshold level setting method is not limited to the method shown in FIG. 2A. Any method may be adopted, for example, such as a method of setting a low-energy region for photon counting as an energy region lower than the threshold level Vth1 as shown in FIG. 2B, or the like. Moreover, as shown in FIGS. 2C and 2D, one energy region for photon counting may be set so as to be a region exceeding or not exceeding a certain threshold level Vth. Furthermore, three or more energy regions for photon counting may be set, and the setting method is arbitrary. For example, in a case of setting four energy regions, four energy regions may be set consecutively with three threshold levels Vth1 to Vth3 as boundaries as shown in FIG. 2E, or four energy regions may be set intermittently by providing six threshold levels Vth1 to Vth6 as shown in FIG. 2F. X-ray transmission images can be obtained in multiple stages by increasing the energy regions for photon counting, enabling finer image processing.

The threshold level setting means 140 refers to the storage means 141, in which the measuring object W and the threshold level thereof are directly or indirectly associated and stored, and keeps the threshold level for the measuring object W specified by the inputted information so that the X-ray detection means 130 can refer to and set the threshold level as the predetermined threshold level. The association between the measuring object W and the threshold level thereof is stored in the storage means 141 as a table in which, for example, the association between the measuring object W as an index and the threshold level is recorded. The storage means 141 may be fixedly provided as a hard disk or a RAM in the apparatus or may be detachably provided as a memory card or the like. The threshold level setting means 140 also displays, for example, an input interface for selecting the measuring object W on the display means 150 such as a display or the like so that a user of the apparatus can input the information specifying the measuring object W.

FIG. 3 shows one example of a table in a case where one or two threshold level(s) are set for each measuring object W. On the table, one or two appropriate threshold level(s) are recorded for each measuring object W, taking into consideration the physical properties of the measuring object W. The measuring object W here is not limited to the measuring object itself, but may be set by being categorized appropriately by the name of the commodity, the name of the foreign matter desired to be detected, the type and material of the measuring object or foreign matter, or the like. Moreover, the measuring object W may be set as a set of the measuring object and the name of the foreign matter desired to be detected. Then, the user is presented with a menu for selecting the measuring object W, which is the table index, and the user selects and inputs the measuring object W by using the input means 160 such as a mouse, a keyboard, a touch panel, a barcode reader, or the like. Subsequently, the threshold level setting means 140 reads threshold levels 1 and 2 for the selected measuring object W from the table and keeps the threshold levels so that the X-ray detection means 130 can refer to the threshold levels as predetermined threshold levels. At this time, the threshold levels do not have to be displayed on the selection menu presented to the user.

The configuration for associating the measuring object W and the threshold level in the table is not limited to the configuration shown in FIG. 3 and may be arbitrarily determined according to a method of inputting the information specifying the measuring object W. For example, in a case of presenting the measuring object W to the user to be selected and inputted as in the case of FIG. 3, in addition to the method of constituting with one table as shown in FIG. 3, it is also possible to adopt a method of constituting with two tables as shown in FIGS. 4A and 4B. Specifically, one table is constituted by a set of the measuring object W and a threshold number as shown in FIG. 4A, the other table is constituted by a set of a threshold number and a threshold level as shown in FIG. 4B, and the measuring object W and the threshold level are indirectly associated by relating both tables with the threshold number. Furthermore, in a case of inputting the information specifying the measuring object W by reading a barcode or QR code (registered trademark) with a barcode reader or by directly inputting the commodity number with the keyboard, by making the index in the table shown in FIG. 3 a number or a commodity number corresponding to the code indicating the measuring object W instead of the measuring object W, the measuring object W corresponding to the code or the commodity number and a threshold level can be associated.

The inspection means 170 inspects the measuring object based on the number of photons detected by the X-ray detection means 130 for each of one or more energy region(s). For example, an X-ray transmission image is generated based on the number of photons detected by the X-ray detection means 130 for each of the two energy regions shown in FIG. 2A, and predetermined processing such as calculating a difference between the images can be performed to generate an image, in which the measuring object W and the foreign matter contained therein are visualized with high contrast. The generated image is displayed on, for example, the display means 150. Note that the result of the inspection itself does not necessarily have to be the output target, and, for example, a control signal of a sorter may be outputted based on the result of the inspection.

Note that the inspection means 170 may inspect the measuring object based on an amount corresponding to the number of photons detected by the X-ray detection means 130 for each of one or more energy region(s). For example, in the X-ray detection means 130, the energy of a detection signal, which is obtained by amplifying a charge of an electron-hole pair generated by the X-ray photons reached each X-ray detection element constituting the X-ray line sensor, is compared with the predetermined threshold level, and the charge amount, which is obtained by integrating the charge amount of the detection signal exceeded or not exceeded the threshold level with a predetermined time, is outputted as an integral charge amount of the X-ray detection element in the energy region defined by the threshold level. In a case of setting two threshold levels as shown in FIG. 2A, the integral charge amounts exceeding the respective threshold levels are successively taken into the memory. Then, a high-energy X-ray transmission image can be generated based on the integral charge amount exceeding the threshold level Vth2 on the high-energy side in each X-ray detection element. A low-energy X-ray transmission image can also be generated based on the charge amount obtained by subtracting the integral charge amount exceeding the threshold level Vth2 on the high-energy side from the integral charge amount exceeding the threshold level Vth1 on the low-energy side in each detection element.

Note that the inspection method performed by the inspection means 170 may be different for each measuring object W. For example, image processing conditions (e.g., a coefficient for each photon counting number and a calculation formula such as addition, subtraction, or the like) are recorded in advance in association with the measuring object W further in the table stored in the storage means 141, and the inspection method for the measuring object W selected and inputted in the threshold level setting means 140 may be executed with reference to the table at the time of execution of the processing by the inspection means 170. By adopting a different inspection method for each measuring object W in this way, for example, even in a case where there is a measuring object W requiring special image processing in order to generate an image with high contrast, an image with high contrast can be obtained by simple setting.

Moreover, the inspection of the measuring object does not necessarily have to be performed by the image generation. For example, the inspection of the measuring object may be performed by internally and directly calculating a difference between or comparing output data for each energy region (such as the number of photons for each detection element).

According to the X-ray inspection apparatus 100 of the present invention described above, since an optimal threshold level can be set according to the physical properties of the measuring object itself and the foreign matter that may be contained therein, it is possible to generate a clear image with high contrast between the measuring object and the foreign matter, enabling accurate inspection of the measuring object regardless of the physical properties of the measuring object and the like. Furthermore, since it is necessary to only select the measuring object W in order to set the threshold level, even a user who is not familiar with the principle of X-ray inspection or the like can perform the setting quickly and correctly.

Note that the present invention is not limited to the above embodiments. The embodiments described above are examples, and anything having substantially the same configuration as the technical idea described in the claims of the present invention and exerting the same operational effects are included in the technical scope of the present invention. For example, although the case where the line sensor is exemplified as the X-ray sensor, the X-ray sensor may be an area sensor or may adopt a time delay integration (TDI) sensor or a time-delayed summation (TDS) sensor to improve the contrast or the S/N ratio.

The invention claimed is:

1. An X-ray inspection apparatus comprising:
    an X-ray emission means for emitting an X-ray to a measuring object to be inspected;
    a conveyance means for conveying the measuring object placed on a placement surface;
    an X-ray detection means for detecting an X-ray photon transmitted through the measuring object by discriminating energy possessed by the X-ray photon into one or more energy region(s) in accordance with a predetermined threshold level;
    a storage means for storing a plurality of different measuring objects and a plurality of threshold levels,
        wherein, in the storage means, each measuring object among the plurality of different measuring objects is directly or indirectly associated with a corresponding threshold level among the plurality of threshold levels;
    a threshold level setting means for
        receiving inputted information specifying the measuring object to be inspected,
        reading, from the storage means, the threshold level corresponding to the measuring object specified by the inputted information, and
        setting the threshold level read from the storage means as the predetermined threshold level used by the X-ray detection means; and
    an inspection means for inspecting the measuring object based on a number of photons or an amount corresponding to the number of the photons detected by the X-ray detection means for each of the one or more energy region(s),
    wherein the X-ray detection means is fixed on a side of the placement surface opposite the X-ray emission means.

2. The X-ray inspection apparatus according to claim 1, wherein the inspection means generates an X-ray transmission image for each of the one or more energy region(s) based on the number of the photons or the amount corresponding to the number of the photons detected by the X-ray detection means for each of the one or more energy region(s), and outputs, as an inspection result of the measuring object, an image obtained by performing predetermined processing on each X-ray transmission image.

3. The X-ray inspection apparatus according to claim 1, wherein
    the storage means further stores information, which indicates an inspection method of the measuring object in the inspection means, in association with the measuring object, and
    the inspection means refers to the storage means and inspects the measuring object by the inspection method for the measuring object specified by the inputted information received by the threshold level setting means.

4. The X-ray inspection apparatus according to claim 1, wherein the amount corresponding to the number of the photons is a charge amount.

5. The X-ray inspection apparatus according to claim 1, wherein
    the X-ray detection means comprises a plurality of X-ray detection elements aligned in a first direction, and
    the conveyance means conveys the measuring object planarly between the X-ray emission means and the X-ray detection means in a second direction orthogonal to the first direction in which the X-ray detection elements are aligned.

* * * * *